United States Patent
Porfiri et al.

(10) Patent No.: US 11,956,669 B2
(45) Date of Patent: Apr. 9, 2024

(54) METHODS AND ARRANGEMENTS FOR DETERMINING INDICATION OF MAXIMUM DATAGRAM SIZE SUPPORTED WITHOUT FRAGMENTATION IN AN IP NETWORK

(71) Applicant: Telefonaktiebolaget LM Ericsson (PUBL), Stockholm (SE)

(72) Inventors: Claudio Porfiri, Stockholm (SE); Carlo Vitucci, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 306 days.

(21) Appl. No.: 17/293,130

(22) PCT Filed: Nov. 20, 2018

(86) PCT No.: PCT/SE2018/051201
§ 371 (c)(1),
(2) Date: May 12, 2021

(87) PCT Pub. No.: WO2020/106194
PCT Pub. Date: May 28, 2020

(65) Prior Publication Data
US 2022/0353735 A1 Nov. 3, 2022

(51) Int. Cl.
*H04L 12/26* (2006.01)
*H04L 41/046* (2022.01)
(Continued)

(52) U.S. Cl.
CPC ............ *H04W 28/06* (2013.01); *H04L 41/046* (2013.01); *H04L 47/2475* (2013.01); *H04L 47/365* (2013.01)

(58) Field of Classification Search
CPC .. H04W 28/06; H04L 41/046; H04L 47/2475; H04L 47/365; H04L 69/24;
(Continued)

(56) References Cited

U.S. PATENT DOCUMENTS

| | | | |
|---|---|---|---|
| 5,959,974 A | 9/1999 | Badt et al. | |
| 7,080,138 B1 * | 7/2006 | Baker | H04L 61/4511 709/227 |

(Continued)

OTHER PUBLICATIONS

Packetization Layer Path MTU Discovery; Network Working Group; Request for Comments: 4821; Category: Standards Track by M. Mathis and J. Heffner—Mar. 2007.
(Continued)

*Primary Examiner* — Phuongchau Ba Nguyen
(74) *Attorney, Agent, or Firm* — Baker Botts L.L.P.

(57) ABSTRACT

A first node (110; 210; 212; 310; 1000) for determining an indication of a maximum datagram size supported without fragmentation in communication between the first node (110; 210; 212; 310; 1000) and a second node (111; 211; 210; 220) in an Internet Protocol, IP, network (100; 201; 201-202; 300). The first node (110; 210; 212; 310; 1000): sends (301; 901), to the second node (111; 211; 210; 220), request messages in varying sized IP packets using an application layer protocol over UDP and which datagrams are configured not to be fragmented; receives (302; 902) response messages from the second node, each indicating a received request message that the response message is in response to, was received by the second node (111; 211; 210; 220); identifies (303; 903) a request message for which there is a change in receipt of response message compared to another request message of said varying sized IP packets; determines (304; 904), based on said identification, an indication of the maximum datagram size supported without fragmentation.

17 Claims, 7 Drawing Sheets

(51) Int. Cl.
*H04L 47/2475* (2022.01)
*H04L 47/36* (2022.01)
*H04W 28/06* (2009.01)

(58) Field of Classification Search
CPC ......... H04L 47/36; H04L 47/19; H04L 47/10; H04L 47/30; H04L 12/5602; H04L 12/5601; H04Q 11/0478
See application file for complete search history.

(56) References Cited

U.S. PATENT DOCUMENTS

| | | | | |
|---|---|---|---|---|
| 8,098,688 | B1* | 1/2012 | Jaladanki | H04L 41/344 370/473 |
| 8,352,600 | B2* | 1/2013 | Calippe | H04L 41/0836 709/225 |
| 2001/0036185 | A1* | 11/2001 | Dempo | H04L 47/10 370/466 |
| 2002/0065908 | A1* | 5/2002 | Agerholm | H04L 63/029 709/223 |
| 2005/0025185 | A1* | 2/2005 | Brown | H04L 69/166 370/465 |
| 2005/0105508 | A1* | 5/2005 | Saha | H04L 43/10 370/352 |
| 2006/0245452 | A1* | 11/2006 | Frederiksen | H04W 28/06 370/470 |
| 2008/0040769 | A1* | 2/2008 | Cha | H04H 60/32 725/134 |
| 2011/0243063 | A1* | 10/2011 | Kuningas | H04W 28/16 370/328 |
| 2015/0038134 | A1* | 2/2015 | Cheng | H04L 1/0007 455/426.1 |
| 2015/0229574 | A1* | 8/2015 | Chiba | H04L 12/4641 370/470 |
| 2021/0226838 | A1* | 7/2021 | Hegarty | H04L 41/0213 |

OTHER PUBLICATIONS

PCT International Search Report issued for International application No. PCT/SE2018/051201—dated Sep. 17, 2019.

UDP Usage Guidelines; Internet Engineering Task Force (IETF); Request for Comments: 8085; BCP: 145; Obsoletes: 5405; Category: Best Current Practice; ISSN: 2070-1721—L. Eggert et al.—Mar. 2017.

PCT Written Opinion of the International Searching Authority issued for International application No. PCT/SE2018/051201—dated Sep. 17, 2019.

* cited by examiner

| 0 | | 4 | 8 | | 16 | 19 | 31 |
|---|---|---|---|---|---|---|---|
| Version | | IHL | Type of Service | | Total Length | | |
| Identification | | | | | Flags | Fragment Offset | |
| Time to Live | | | Protocol | | Header Checksum | | |
| Source IP Address | | | | | | | |
| Destination IP Address | | | | | | | |
| Options | | | | | | Padding | |

METHODS AND ARRANGEMENTS FOR DETERMINING INDICATION OF MAXIMUM DATAGRAM SIZE SUPPORTED WITHOUT FRAGMENTATION IN AN IP NETWORK

PRIORITY

This nonprovisional application is a U.S. National Stage Filing under 35 U.S.C. § 371 of International Patent Application Serial No. PCT/SE2018/051201 filed Nov. 20, 2018 and entitled "Methods and Arrangements for Determining Indication of Maximum Datagram Size Supported Without Fragmentation in an IP Network" which is hereby incorporated by reference in its entirety.

TECHNICAL FIELD

Embodiments herein concern a method and arrangements relating to determination of maximum datagram size supported without fragmentation in communication between two nodes of an IP network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

The Ethernet Maximum Transmission Unit (MTU) is the largest number of bytes, individual datagrams can have on a particular data communication link. MTU relates to the maximum frame size that can be transported on the data link layer, e.g. Ethernet frame. When a protocol's packets or frame get encapsulated within another protocol, there is an overall increase in the frame size. Number of protocols and encapsulation is increasing e.g. by IP Security (IPSec), and the datagram packet size is typically unknown by higher protocol applications. The result is inefficient bandwidth usage due to datagram fragmentation at the Ethernet layer. An existing technology addressing the MTU issue is the so called Path MTU Discovery (PMTUD) that relies on TCP or some other Packetization Layer to probe an Internet path with progressively larger packets. This method is described as an extension to RFC 1191 and RFC 1981, which specify Internet Control Message Protocol (ICMP) based PMTUD for IP versions 4 and 6, respectively.

However, there are some limitation and problems related to PMTUD. For example, PMTUD relies on Internet Protocol (IP) version 4 (IPv4) and Internet Control Message Protocol (ICMP). Also, if there is a firewall in the middle of the communication path it may block ICMP error messages, this prevents PMTUD from operating properly. Moreover IPv6 routers do not support fragmentation and PMTUD works by initially assuming the path MTU is the same as the MTU on the link layer interface where the traffic originates. Then, similar to IPv4, any device along the path whose MTU is smaller than the packet will drop the packet and send back a so called ICMPv6 Packet Too Big (Type 2) message containing its MTU, allowing the source host to reduce its Path MTU appropriately. The process is repeated until the MTU is small enough to traverse the entire path without fragmentation.

The Internet Engineering Task Force (IETF) has proposed a Packetization Layer PMTUD (PLPMTUD) and described how this applies to TCP and Stream Control Transmission Protocol (SCTP). By being TCP and SCTP connection oriented, there is a feedback mechanism that allow an easy implementation of PLPMTUD. Protocols such as HTTP can already exploit PLPMTUD as this is implemented on many versions of TCP.

However, IETF provides no solution on how PLPMTUD can be implemented in the User Datagram Protocol (UDP), as UDP doesn't provide any feedback mechanism.

In 4G and 5G RANs, UDP based protocol, such as S1-U, X2-U, N2-U and generally speaking all User Plane protocols, are not providing any feedback mechanism that can be used for PLPMTUD. Thus such protocols conventionally have to rely on the ICMP based PMTUD, and hence also have problems related to that. As a result it can be considered to be a need for a new solution able to provide accurate measurement of maximum payload for User Plane traffic in wireless communication networks and in 4G and 5G RANs in particular.

SUMMARY

In view of the above, an object is to provide one or more improvements in relation to the prior art and relating to determination of maximum datagram size supported without fragmentation in an IP based network, for example corresponding to determining MTU. It is particularly desirable to provide improvements compatible with UDP based protocols, such as S1-U, X2-U, N2-U, used in wireless communication networks, e.g. as in 4G and 5G RANs.

According to a first aspect of embodiments herein, the object is achieved by a first node of an Internet Protocol (IP), network, for determining an indication of a maximum datagram size supported without fragmentation in communication between the first node and a second node of said IP network. The first node sends, to the second node, request messages in varying sized IP packets using an application layer protocol over User Datagram Protocol (UDP). The IP packets are configured not to be fragmented by the IP network. The first node receives, from the second node, in response to the sent request messages, one or more response messages, respectively. Each response message indicating that a datagram of a request message that the response message is in response to, was received by the second node. The first node identifies a request message of said varying sized IP packets for which there is a change in receipt of response message compared to another request message of said varying sized IP packets. The first node determines, based on said identification, an indication of a maximum datagram size supported without fragmentation for application layer data communication over UDP between the first node and the second node.

According to a second aspect of embodiments herein, the object is achieved by a computer program comprising instructions that when executed by a processing circuit causes the first node to perform the method according to the first aspect.

According to a third aspect of embodiments herein, the object is achieved by a carrier comprising the computer program according to the second aspect.

According to a fourth aspect of embodiments herein, the object is achieved by a first node for determining an indication of a maximum datagram size supported without fragmentation in communication between the first node and a second node in an IP network. The first node is configured to send, to the second node, request messages of varying sized IP packets using an application layer protocol over UDP, and which IP packets are configured not to be fragmented by the IP network. The first node is configured to receive, from the second node, in response to the sent request messages, one or more response messages, respectively. Each response message indicating that a datagram of a request message that the response message is in response to, was received by the second node. The first node is configured to identify a request message of said varying sized IP packets for which there is a change in receipt of response message compared to another request message of said varying sized IP packets. The first node is further configured to determine, based on said identification, an indication of a maximum datagram size supported without fragmentation for application layer data communication over UDP between the first node and the second node.

Embodiments as described above offer a solution to the problem discussed in the Background, viz. that UDP as such is not providing any feedback mechanism that allows for PLPMTUD. Embodiments as described above offer another way based on feedback to determine an indication of maximum datagram size supported without fragmentation for application layer data communication over UDP. Further, the e.g. less reliable and robust ICMP based PMTUD can be avoided and hence reliability and robustness can be increased thanks to embodiments herein.

Moreover, embodiments as described above can and are advantageously implemented using an existing application layer protocol supported by relevant nodes, e.g. the Simple Network Management Protocol (SMTP). It may thereby suffice to configure an existing node corresponding to the first node 110 so that it performs as described above, e.g. operating as an SNMP Manager that performs as above, and that thereby will make another existing node, corresponding to the second node, e.g. operating as an SNMP Agent, to respond as the second node 111 above. The possibility to implement using e.g. SNMP has particular advantages and implementation may be accomplished by comparatively simple modification, e.g. by configuration in SW of an existing node supporting SNMP to enable it to act as the first node above.

Hence, embodiments herein provide one or more improvements in relation to the prior art and relating to determination of maximum datagram size supported without fragmentation in an IP based network, for example corresponding to determining MTU. Embodiments herein, as explained above, are further compatible with UDP based protocols, such as S1-U, X2-U, N2-U, used in wireless communication networks, such as in 4G and 5G RANs.

Thanks to embodiments herein and improved determination of maximum datagram size supported without fragmentation in an IP based network, for example by determining MTU, available sources, e.g. bandwidth, can be more efficiently utilized and capacity degradation avoided. This in turn enable cost savings for operators and service providers and also end users since these in the end typically have to bear costs that service providers else cannot avoid. Moreover, quality of service is typically improved and the end users have a better user experience when capacity degradation situations to a greater extent can be avoided thanks to embodiments herein.

BRIEF DESCRIPTION OF THE DRAWINGS

Examples of embodiments herein are described in more detail with reference to the appended schematic drawings, which are briefly described in the following.

DETAILED DESCRIPTION

Figure 1:
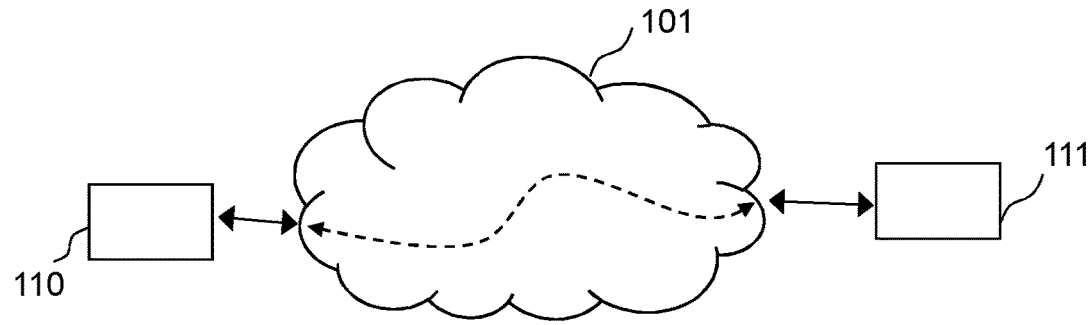
FIG. 1 is a block diagram schematically depicting an example of an IP network relevant for embodiments herein.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

FIG. 1 is a block diagram schematically depicting an example of an IP network 100 that is relevant for embodiments herein and in which embodiments herein may be implemented. As used herein, IP network refers to a data communication network based on, such as implemented to support, the Internet Protocol, e.g. version 4 or version 6, i.e. IPv4 or IPv6. The figure shows a first node 110 and a second node 110 of the IP network 100, which may be referred to as network nodes. The nodes 110, 111 are communicatively connected in the IP network 100, typically via one or more further nodes 101 of the IP network 100, e.g. involving one or more routers and/or other nodes and/or equipment involved in the communication of IP traffic in the IP network 100. The first and second nodes 110, 111 may be identified by IP addresses, respectively, in the IP network 100.

Figure 2:
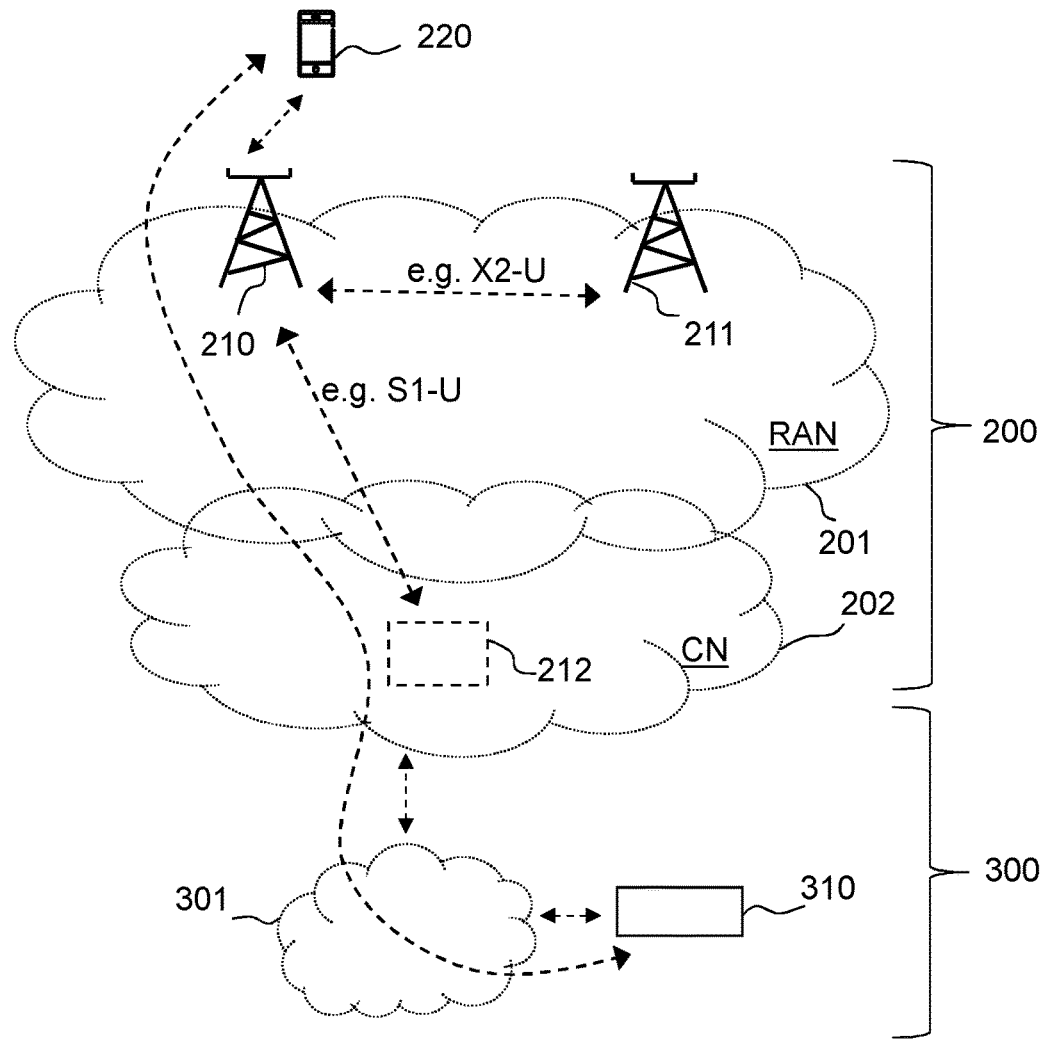
FIG. 2 is a block diagram schematically depicting an example of a wireless communication network comprising an IP network relevant for embodiments herein.

FIG. 2 is a schematic block diagram schematically depicting an example of a wireless communication network 200 that is relevant for some embodiments herein and in which some embodiments herein may be implemented. The wireless communication network 100 may comprise a Radio Access Network (RAN) 201 part and a core network (CN) 202 part. The wireless communication network 200 is typically a telecommunication network or system, such as a cellular communication network that supports at least one Radio Access Technology (RAT), e.g. LTE, or 4G, New Radio (NR) that also may be referred to as 5G.

The wireless communication network 200 comprises network nodes that are communicatively interconnected. The network nodes may be logical and/or physical and are located in one or more physical devices. The wireless communication network 200, typically the RAN 201, may comprise a first radio network node 110, and a second radio network node 111, i.e. network nodes being or comprising a radio transmitting network nodes, such as base stations, and/or that are being or comprising controlling nodes that control one or more radio transmitting network nodes. Said radio network nodes may e.g. be communicatively connected, such as configured to communicate, over, or via, a so called X2-U communication interface or communication link.

Further, the wireless communication network 100, or rather the CN 202 may comprise one or more core network nodes, e.g. a core network node 212, such as a Serving GateWay (S-GW), that may be communicatively connected, such as configured to communicate, over, or via, a so called S1-U communication interface or communication link, with radio network nodes of the RAN 201, e.g. with the first radio network node 210.

As mentioned in the Background, S1-U, X2-U are IP/UDP based and are examples of user plane protocols used in e.g. LTE and NR wireless communication networks. These user plane protocols can be considered to correspond to application layer protocols in terms of a IP network in general.

Hence, the wireless communication network 200 can be considered to comprise one or more IP networks. For example, the first and second radio network nodes 110, 111 may be communicatively interconnected, e.g. via X2-U, in an IP network part of the RAN and in this situation the first network node 210 can be considered to correspond to the first node 110 of FIG. 1 and the second network node 211 can be considered to correspond to the second node 111 of FIG. 1. Moreover, the first network node 210 may be communicatively connected, e.g. via S1-U, to the core network node 212. This connection is in an IP network of the wireless communication network 200 that connects the RAN 201 and CN 202. In this situation the first network node 210 can be considered to correspond to the first node 110 of FIG. 1 and the core network node 212 can be considered to correspond to the second node 111 of FIG. 1, or vice versa.

The wireless communication network 100, or specifically one or more network nodes thereof, e.g. the first network node 110 and the second network node 110, is typically configured to serve and/or control and/or manage one or more wireless communication devices, such as a communication device 220, in radio coverage areas, i.e. an area where radio coverage is provided for communication with one or more communication devices. The communication device 220 may alternatively be named a wireless device and it may correspond to a User Equipment (UE). Each radio coverage may be provided by and/or associated with a particular Radio Access Technology (RAT). The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. There may be more than one beam provided by one and the same network node.

The wireless communication network, e.g. the CN 102 thereof, may further be communicatively connected to, e.g. via the core network node 212, and thereby e.g. provide access for said communication device 220, to an external IP network 300, e.g. the Internet. The external IP network comprise and are connected to further network nodes, e.g. an external network node 310. External here refers to external vs. the wireless communication network 200. The external network node 310 may e.g. correspond to a server providing service(s) to one or more other internet connected devices, e.g. the communication device 220 that may be provided with access to the external IP network 300, such as the Internet, via the wireless communication network 200, e.g. specifically the core network node 220 as mentioned above. The communication device 220 may thus be communicatively connected, e.g. by means of UDP/IP and an application layer protocol, via the wireless communication network 200 and the external IP network 300, with the external network node 310. This has been indicated in the figure by a dotted line between the communication device 220 and the external network node 310. The external network node may e.g. be a server providing a video streaming service accessed via an application, or app, executing on the communication device. In this situation, the communication device 220, via wireless communication network 200 and e.g. the CN 202 and core network node 212, such as a S-GW, be considered nodes of the external IP network 300. A similar situation could arise with another or the same communication device that is connected to the Internet via a Local Area Network (LAN), e.g. a WiFi network at home, instead of to the wireless communication network 200, e.g. LTE, as discussed above. In these situations, the communication device 220 may be considered to correspond to the first network node 110 of FIG. 1 and the external network node 310 may be considered to correspond to the second network node 111 of FIG. 1.

Attention is drawn to that FIG. 1 and FIG. 2 are only schematic and for exemplifying purpose and that not everything shown in the figured may be required for all embodiments herein, as should be evident to the skilled person. Also, an IP network and/or wireless communication network that correspond(s) to the ones shown in the figures will typically comprise several further network nodes and details, as realized by the skilled person, but which are not shown herein for the sake of simplifying.

Figure 3:
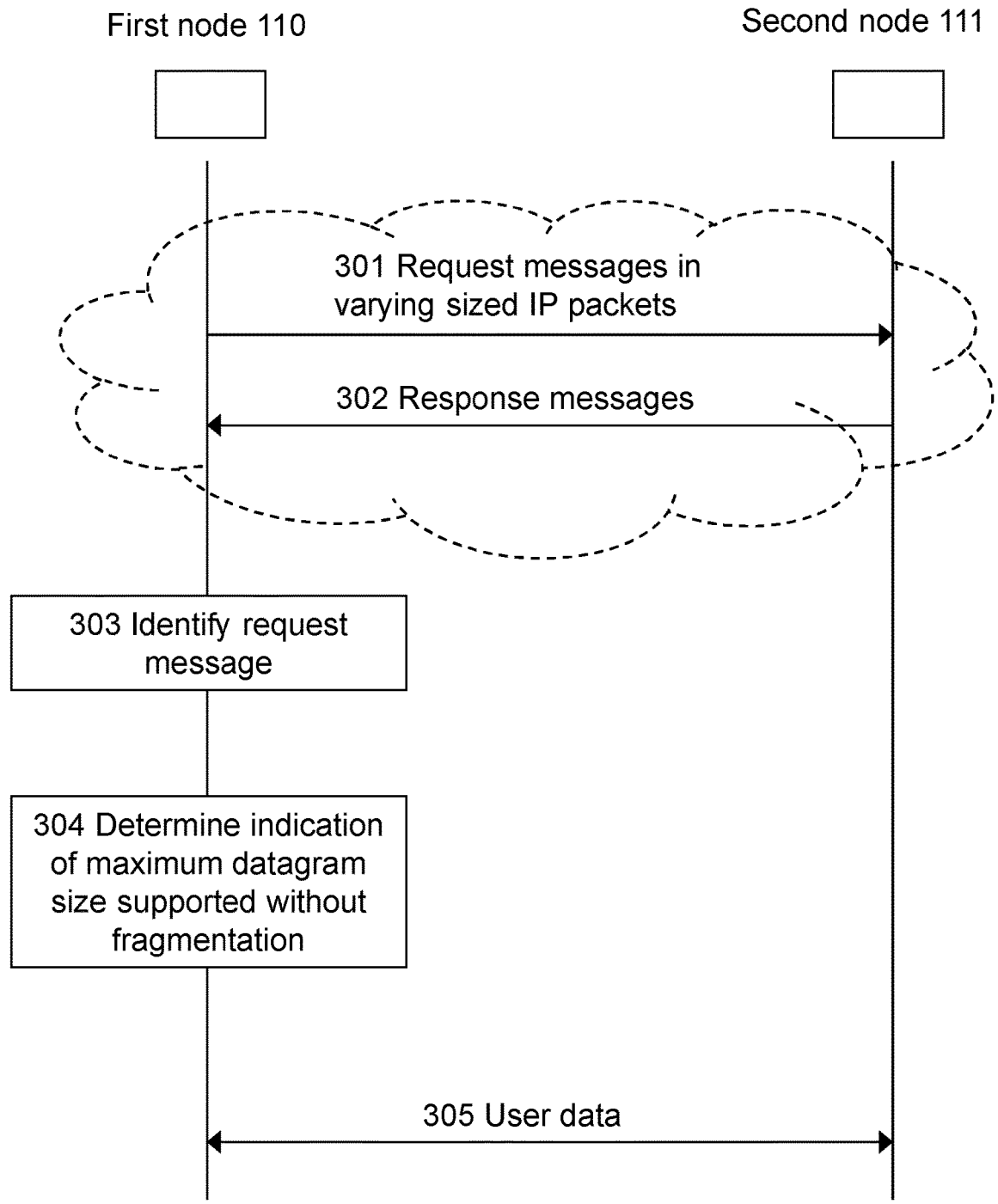
FIG. 3 is a combined signaling diagram and flowchart for describing embodiments herein.

FIG. 3 depicts a combined signaling diagram and flowchart, which will be used to discuss embodiments herein.

The actions below are for determining an indication of a maximum datagram size supported without fragmentation in communication between two nodes of an IP network. As understood from the above, the IP network may be part of or involve a wireless communication network, e.g. a telecommunication network. It should be appreciated that the indication of the maximum datagram may correspond to an Ethernet MTU. In the shown example and in the following, the nodes are mainly exemplified by the first node 110 and the second node 111, and the IP network by the IP network 100. However, as indicated above: in some embodiments the first network node may be the first radio network node 210, the second network node may be the second radio network node 211, or vice versa, and the IP network be an IP network part of the RAN 201; in some embodiments the first network node may be the first radio network node 210, the second network node may be the core network node 212, or vice versa, and the IP network be an IP network part of the wireless communication network 200 that connects the RAN 101 and the CN 102; in some embodiments the first network node may be the external network node 310, the second network node may be the communication device 220, and the IP network may correspond to the external IP network 300.

The actions below may be taken in any suitable order and/or be carried out fully or partly overlapping in time when this is possible and suitable.

Action 301

The first node 110 sends, to the second node 111, request messages in varying sized IP packets with datagrams using an application layer protocol over UDP. The IP packets thus contain UDP datagrams, respectively.

The varying sized IP packets may be accomplished by e.g. varying sized UDP datagrams and/or by using varying sized padding in the IP packets, as explained below, or similar, that enables to vary the size in a controlled manner. Each request message may thus be contained in a UDP datagram that in turn is contained in an IP packet.

It should be assured that the IP packets and/or datagrams are not allowed to be fragmented by the IP network 100, or at least that the IP network does not forward and/or discard IP packets, even if fragmentation would be required. Such behavior can be accomplished by configuring the IP packets and/or datagrams and/or the IP network.

The IP packets and/or datagrams may e.g. be configured not to be fragmented by the IP network by setting a "don't fragment" flag in the IP headers of the IP packets, or by other means if such available to accomplish such effect in the IP network 100.

As should be realized, the varying sized IP packets and/or datagrams, typically in a predefined or predetermined manner, provide knowledge, at least at the first node 110, of the size of the IP packet(s) and/or datagram(s) that resulted in a response message, which size can be considered to indicate and/or correspond to the maximum datagram supported.

The varying sized IP packets may preferably but not necessarily be accomplished in a predefined or predetermined manner. The IP packets may e.g. be consecutively larger or smaller in size, e.g. increased or decreased by a fix size for each sent request message. A detailed example how this can be accomplished is described separately below.

Action 302

The first node 110 receives, from the second node 111, in response to the sent request messages in Action 301, respectively, one or more response messages. The first node thus sends a response messages to the second node in response to each received request message. Each response message indicates that a datagram of a request message that the response message is in response to, was received by the second node 111.

The response messages, or type of response messages, may be predefined and be determined, e.g. selected, by the request messages and/or the application layer protocol being used. The size of a response message may e.g. be influenced and/or controlled by the request message that the response message is in response to.

Further, the response messages should preferably be sufficiently small, i.e. in size, to avoid fragmentation, that is, so that any IP packets carrying a response message, or datagram of the response message, is not, or do not risk to be fragmented in the IP network 100 before it is received by the first node 110. This may mean, at least in some embodiments with IPv4, that the response messages should be at most 576 bytes. Response messages that avoid fragmentation are preferred and increase robustness since there may be circumstances where it is difficult to fully influence or control how nodes corresponding to the second node 111 will behave. If these e.g. would be configured to avoid fragmentation, response messages that would cause fragmentation would never reach the first node.

Examples of some application layer protocols, request and response messages that can be used are provided separately below.

Action 303

The first node 110 identifies a request message of said varying sized IP packets for which there is a change in receipt of response message compared to another request message of said varying sized IP packets.

The change may relate to a switch from presence to absence of response messages, or vice versa, at a certain change in size of the IP packets carrying these response messages. Or, in other words, that two consecutive in size IP packets with request messages, e.g. consecutively sent request messages in IP packets of different sizes, result in one received, i.e. presence of one, response message and one non-received, i.e. absence of one, response message. The absent response message should be one that would be expected to be received if the corresponding request message had been received by the second node.

A first example of the change may e.g. be that a response message is received for a request message in a first sized IP packet and it is then not received a response message for a request message in a second, larger, sized IP packet. There may e.g. be a sequence of increasingly sized IP packets with request messages and at some IP packet of a certain size there is no longer received any response message, i.e. the change occur.

A second example of the change is that there is no response message received for a request message in a third sized IP message and then it is received a response message for a request message in a fourth, smaller, sized IP packet. There may e.g. be a sequence of decreasingly sized IP packets with request messages for which there are no response message and at some IP packet of a certain size there is received a response message, i.e. the change occur.

A response message is not received in case the response message, that the response message should be in response to, never reached the second node 111. This happens if the IP packets with the request message is of a size where fragmentation would happen, but since fragmentation has been set not to be allowed, a request message of such IP packet will never result in a response message. There may be sent a number of request messages of IP packets of a size that do not result in receipt of a response message, i.e. repeated sending, to reduce the risk that absence of a response message is due to other reasons. An example of this is discussed separately below.

Action 304

The first node 110 determines, based on the identification of Action 303, an indication of a maximum datagram size supported for application layer data communication over UDP between the first node 110 and the second node 111.

For example, in case of consecutively larger datagrams in Action 301, this provide information, in combination with Action 303, at least at the first node 110, that can identify size of the last datagram that resulted in a response message. This size can thus be considered to indicate and/or correspond to the maximum datagram supported.

In some embodiments, the indication is a measure that is further determined based on a size of a last, or closest in size, IP packet of said varying sized, e.g. consecutively larger, IP packets that carried a request message resulting in a response message.

In some embodiments, the indication is a measure that is further determined based on the size of an IP packet of said varying sizes that carried a request message resulting in a response message, and which IP packet is closest in size to the IP packet of said identified request message in Action 303. In case the change in Action 303 relates to a switch from presence to absence of response message, the IP packet closest in size will be smaller than the IP packet of said identified request message. In case the change in Action 303 relates to a switch from absence to presence of response message, the IP packet closest in size is the IP packet of said identified request message, i.e. the IP packet itself.

The datagrams sent using the application layer protocol over UDP will be experience the same, network behaviour as data traffic over UDP. In other words, said determined indication or measure of the maximum datagram size will be indicative of the maximum datagram size supported without fragmentation for application layer data communication over UDP between the first node and the second node.

Action 305

The first node 110 and/or the second node 111 may then thus use the determined indication or measure, such as MTU size, that does not cause fragmentation, to communicate user data between them over UDP, i.e. application layer data communication over UDP.

Actions 301-304 may be used for setting up communication of user data to take part thereafter, e.g. streaming video and/or audio, between the first node 110 and the second node 111. The communication may thus use a measure, e.g. MTU size, determined based on Action 304.

In other words, the determined measure mentioned above, such as MTU size, is advantageously used for communication of user data between the involved nodes.

A service provider, providing e.g. a video and/or audio streaming service, may use a measure of the of the maximum datagram size supported without fragmentation between two nodes, corresponding to the first node 110 and the second node 111, which measure, e.g. MTU size, is based on Actions 301-304, to configure or set-up the first node 110 and/or the second node 111 for communication of user data according to the provided service. Similarly, the service provider may use the determined measure, e.g. MTU size, in the first node 110 and/or in the second node 111, for or in the communication of user data, such as streaming video and/or audio data, to and/or from the other of said nodes. The user data corresponding to application layer data and the communication taking part over UDP.

The application layer protocol over UDP is advantageously, or is advantageously based on, the Simple Network Management Protocol (SNMP). The first node 110 may operate as, or comprise, an SNMP Manager, at least when/for sending the request messages. The second node 111 may be managed by the SNMP manager and may operate as, or comprise, an SNMP Agent at least when/for sending the response messages.

This facilitate implementation and with a minimum of modifications in an existing network since SMTP typically is well supported by nodes and embodiments herein does not require any particular version of SMTP. To make an existing node operate as the second node as an SNMP agent may not need any modification at all if SNMP is already supported. It may further suffice with some comparatively simple modifications to configure an existing node to operate as the first node as an SNMP manager and as such carry out the method as described above.

In these embodiments, the consecutively larger datagrams may be sent as, or by sending, SNMP GetRequest messages and the response messages may thus correspond to SNMP GetResponse messages.

Implementation of embodiment herein based on SNMP are explained in further details separately below in relation to FIGS. 4-8.

An example of another application layer protocol over UDP that alternatively can be used is HyperText Transfer Protocol (HTTP). The following illustrates the principle using an example. A client, e.g. the first node 110, may issue a HTTP GET request, to ask a server, e.g. the second node 111, for a document. For example, the first node may issue: GET/index.html HTTP/1.0, where a document named "/index.html" is asked for with negotiation to use the HTTP/1.0 protocol. Note that this request message does not contain a body and that a blank line may be needed after the request header.

The second node 111, if it receives the request message, may then interpret and map the requested Uniform Resource Identifier (URI), i.e. the request-URI, to a document under its document directory. If the requested document is available, the server may as a response message return the document with a response status code, e.g. "200 OK". If the document is not found, a "404—Page not found" message may instead be returned as response message.

As realized from the above and also in view of the more detailed examples below, embodiments herein and as described above in relation to FIG. 3 offer a solution to the problem discussed in the Background, viz. that UDP as such is not providing any feedback mechanism that allows for PLPMTUD. Embodiments as described above offer another way based on feedback to determine an indication of maximum datagram size supported without fragmentation for application layer data communication over UDP. Further, the e.g. less reliable and robust ICMP based PMTUD can be avoided and hence reliability and robustness can be increased thanks to embodiments herein. As described above, embodiments herein facilitate implementation without requiring any advanced or costly modifications or add-ons to existing networks.

Moreover, embodiments as described above are advantageously implemented using SNMP. It may thereby suffice to configure an existing node corresponding to the first node 110 so that it performs as described above, e.g. operating as an SNMP Manager that performs as above, and that thereby will make another existing node, corresponding to the second node, e.g. operating as an SNMP Agent, to respond as the second node 111 above. The possibility to implement using SNMP has particular advantages and implementation may be accomplished by comparatively simple modification, e.g. by configuration in SW of an existing node supporting SNMP to enable it to act as the first node above.

Hence, embodiments herein provide one or more improvements in relation to the prior art and relating to determination of maximum datagram size supported without fragmentation in an IP based network, for example corresponding to determining MTU. Embodiments herein, as explained above, are further compatible with UDP based protocols, such as S1-U, X2-U, N2-U, used in wireless communication networks, such as in 4G and 5G RANs.

Thanks to embodiments herein and improved determination of maximum datagram size supported without fragmentation in an IP based network, for example by determining MTU, available sources, e.g. bandwidth, can be more efficiently utilized and capacity degradation avoided. This in turn enable cost savings for operators and service providers and also end users since these in the end typically have to bear costs that service providers else cannot avoid. Moreover, quality of service is typically improved and the end users have a better user experience when capacity degradation situations to a greater extent can be avoided thanks to embodiments herein.

In the case the first and second nodes 110, 111 both are radio network nodes, e.g. the radio nodes 210, 211, such as base stations, e.g. eNBs if the wireless communication network 200 is a LTE network, or gNBs in case of a 5G, or NR, network, the determined indication of the maximum datagram size may be indicative of the maximum datagram size supported for user plane communication over UDP between the involved radio network nodes in the RAN 201, such as over a X2-U interface in case of LTE. Correspondingly, in the other case, with one of the first and second nodes 110, 111 being a core network node, e.g. the core network node 212, such as a S-GW, and the other a radio network node, e.g. the first radio network node 210, the determined indication of the maximum datagram size may instead be indicative of the maximum datagram size supported for user plane communication over an interface between the core network node 212 and the first radio network node 210, e.g. over the S1-U interface in case of LTE.

Embodiments herein thus enable to determine a maximum datagram size supported, and thus maximum payload, for RAN user plane traffic. A RAN operator is thereby e.g. enabled to get correct information on an end to end (e2e) connection in the RAN without the need for introducing extra HW or equipment for this purpose. Embodiments herein may be described as providing a mechanism for MTU detection on S1-U, X2-U, N2-U or any of the User Plane traffic in 4G and 5G without the need of changing the protocols at 3GPP level.

Some further detailed embodiments and information regarding implementation will now be discussed.

Figure 4:
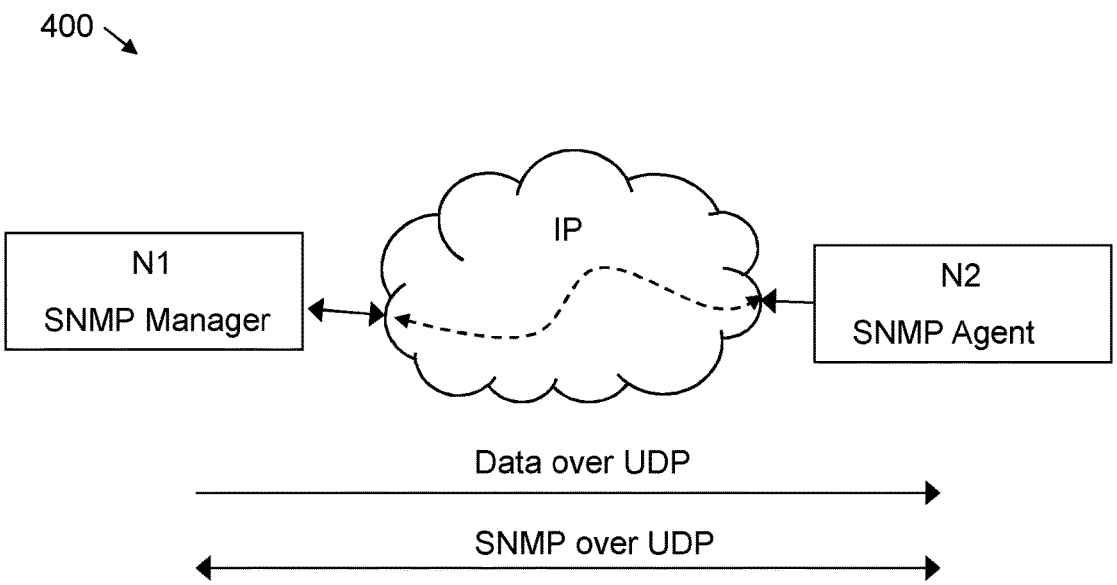
FIG. 4 schematically illustrates an exemplifying scenario relevant for embodiments herein.

FIG. 4 schematically illustrates an exemplifying scenario relevant for embodiments herein and where SNMP is used as the application layer protocol. The scenario involves a node N1 that may be referred to as a SNMP Manager node and may correspond to the first node 110 above operative as SNMP Manager, and a node N2 that may be referred to as a SNMP Agent node and may correspond to the second node 111 above operative as SNMP Agent. The node N1 and the node N2 are connected both to the same IP network 400. In the scenario there may be a need to send data from node N1 to node N2 using a protocol based on UDP and there may be a need to use available bandwidth efficiently. In other words there will be data traffic between node N1 and node N2. Further, in the scenario the IP network configuration may be generic and it may not be possible to impose any HW or SW to any of the elements used for the IP network. Also the node N1 and N2 may be generic and may not have any specific HW for network supervision such as, for example, dedicated Two-Way Active Measurement Protocol (TWAMP) responders. Embodiments here are thus based on the existence of an SMNP Manager at N1 and an SNMP Agent at N2. Note that for the embodiments to work it's not needed any Management Information Base (MIB) description for node N2, not even that node N1 and node N2 are using a specific version of SNMP. It should be sufficient that node N1 and node N2 are capable of SNMP and since SNMP is UDP based, that SNMP is available on the same IP address as data traffic between the nodes.

According to SNMP, whenever a SNMP Manager sends a request for a Management Information Base (MIB) fragment to a SNMP Agent by means of the so called GetRequest signal, the SNMP Agent will reply with the so called GetResponse signal. If, for any object named in the variable-bindings field, the object is an aggregate type, as defined in the Structure of Management Information (SMI), then the receiving entity sends to the originator of the received message a GetResponse Protocol Data Unit (PDU) of identical form, except that the value of the error-status field is noSuchName and the value of the error-index field is the index of said object name component in the received message. This way the response is guaranteed and the solution may thus be based on a preset MIB request, for example according to a predefined MIB subtree. The request may e.g. be requesting for iso.org.dod.internet, i.e. an Object Identifier (OID), here at root level.

A basic idea can thus be to utilize SNMP or HTTP, or any other suitable existing application layer protocol, at the first node 110, to request something from the second node 111, e.g. by using a suitable request message of that protocol, that will generate a predetermined response message, e.g. by requesting something that, if the request is received, triggers a, preferably predetermined, response. The response may relate to the the request can be met or not. If it cannot be it may trigger a predetermined error message in response. E.g. in case of SNMP an "Object not found message" or in case of HTTP a "404—Page not found" message.

Figure 5:
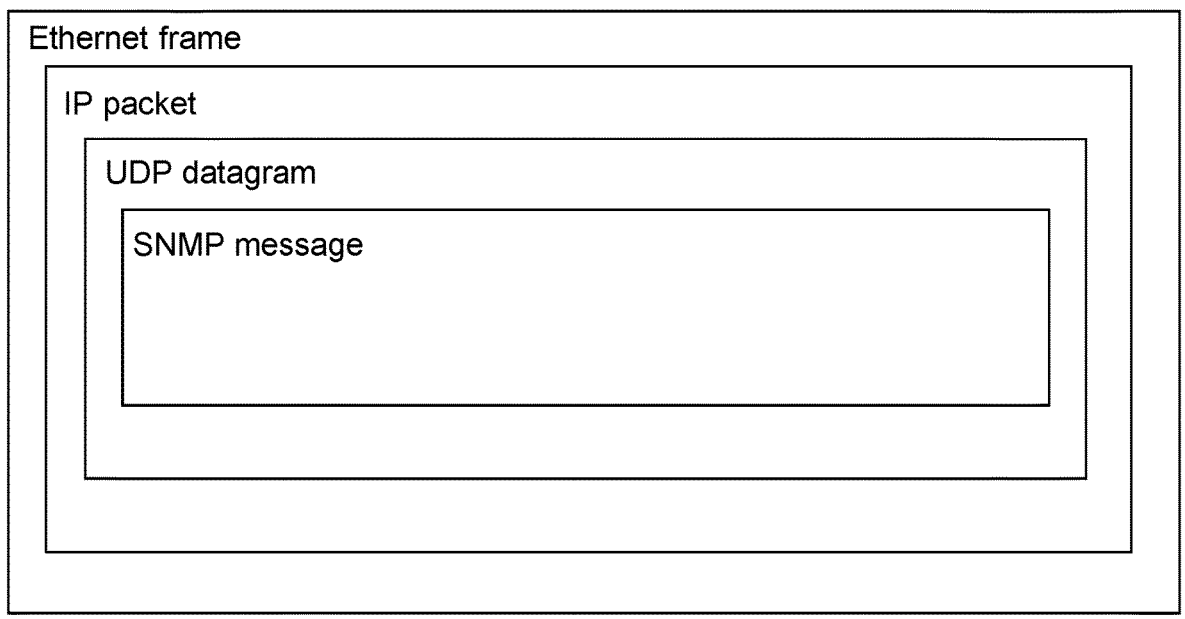
FIG. 5 schematically illustrates a datagram format when UDP is used as transport mechanism.

FIG. 5 schematically illustrates a datagram format when UDP is used as transport mechanism and a SNMP message is transported, e.g. carrying the GetRequest or GetReponse signal mentioned above, or in other words when a SNMP signal is transported over UDP.

As should be understood from the above and the scenario discussed, a SNMP signal transported over UDP and when SNMP/UDP is using the same IP addresses as the data traffic, the SNMP signal will experience the same network behavior as the data traffic over UDP. This principle also holds true for other similar application layer protocols.

IP datagram fragmentation and reassembly roles are defined in RFC 791. The Identification field along with the foreign and local internet address and the protocol ID, and Fragment offset field along with Don't Fragment and More Fragment flags are hosted in the IP protocol header. If an IP datagram is marked as "don't fragment", typically by means of the "don't fragment" flag, it will not fragmented under any circumstances. If an IP datagram marked don't fragment cannot be delivered to its destination without fragmenting it, it will instead be discarded.

Figures 6, 7:
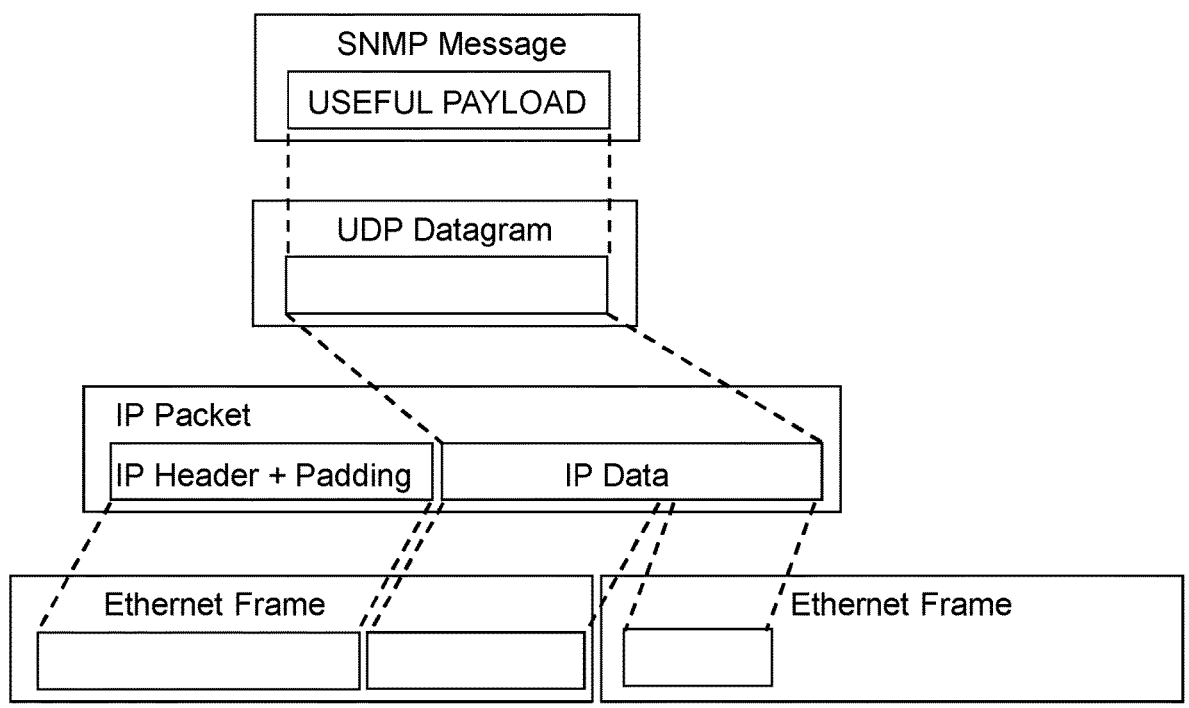
FIG. 6 schematically illustrates an IP header summary.
FIG. 7 schematically illustrates how padding can cause fragmentation and be utilized in some embodiments.

FIG. 6 schematically shows a summary of an IP header of an IP datagram, where padding is used in the datagram structure in order to have 32 bytes aligned packets. As indicated above, padding is one way of being able to accomplish, e.g. set, a certain size of a IP packet carrying a request message and thereby accomplish the varying sized IP packets. Generally speaking, not only padding can be used to control the size of IP packets carrying the request messages and thereby accomplishing the varying sized IP packets. Another way of explaining it is to extend a request message at the IP PDU level so that the IP packet, or PDU, will be of certain size and utilize this to accomplish the varying sized IP packets, or PDUs. Other possibilities to control the size of an IP packet with request message include e.g. extending argument of the request message, e.g. SNMP GetRequest with e.g. OID as argument, with dummy names or similar, and/or several arguments, e.g. OIDs in a list.

Embodiments herein may, at least when based on SNMP as in the exemplifying scenario, suffice to be implemented at the node of the SNMP Manager only. Embodiments herein may utilize said "don't fragment"-flag and incremental padding of packets at the SNMP Manager, such as in node N1, to "arm" and send SNMP GetRequest-messages over UDP to the SNMP Agent in node N1 until a SNMP GetResponse-message is not received. At that point the MTU may be determined as:

MTU=GetRequest UDP size+latest padding size added with response

Or in other words, the MTU, that may be considered to correspond to, or at least be indicative of, the maximum datagram size supported without fragmentation for application layer data communication over UDP, may be determined based on the size of the UDP datagram carrying the GetRequest message plus the size of the latest padding size added and that resulted in a GetResponse-message.

FIG. 7 schematically illustrates the above principle and how said padding can be utilized. The IP Data in the figure represents what is added by protocols and services. As can be seen, the total IP Packet including the Padding is in this case too large to be carried in one and the same Ethernet frame and there is fragmentation into two Ethernet frames. In other words, the padding has here caused fragmentation. Without the padding, or with less padding, the whole IP Packet would fit in one Ethernet frame in the shown case and there would be no fragmentation.

Figure 8:
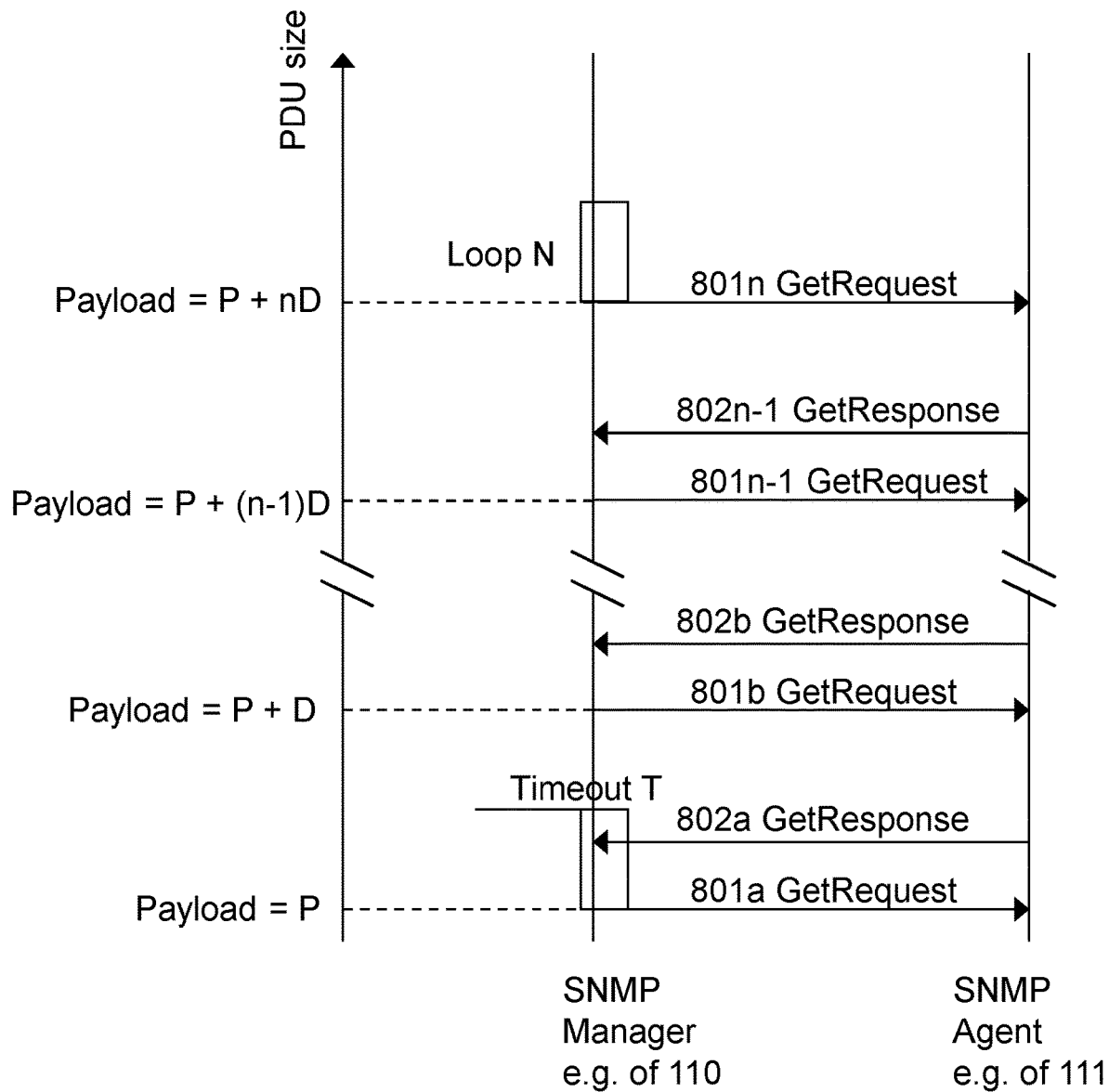
FIG. 8 is signaling diagram for exemplifying some embodiments in detail.

FIG. 8 is signaling diagram for exemplifying SNMP based embodiments as above in some further detail. The figure illustrates how a SNMP Manager, e.g. in node N1 or the first node 110 is sending GetRequest messages to a SNMP Agent, e.g. in node N2 or the second node 111. The start is a SNMP packet, containing a first GetRequest message, of a size "P", corresponding to a payload that equals P. The payload is then increased incrementally by means of increased padding, where the padding is being incremented with a size "D" each time, resulting that the payload at each increment is increased by D, i.e. for each subsequent SNMP GetRequest message that is sent. Thus, after n increments, the payload equals P+nD. The SNMP Manager will await receiving a GetResponse within a time window "T" after each sent GetRequest message. Once T is over, i.e. timeout, without receiving the GetResponse back, the SNMP Manager should stop incrementing and may try to send GetRequest again a number of times, e.g. "N" times. If it will face "N" timeouts, then the MTU without causing fragmentation may be determined as $MTU=P+(n-1)D$ In other words, the MTU is here based on the initial packet size or payload, information on the additional payload added at each increment, and the number of increments, or more exactly here the number of increments before the packet size resulted in no GetResponse message, which would be due to that the packet size would cause fragmentation and such packets therefore were discarded owing to that datagrams had been controlled not to be fragmented, i.e. fragmentation not allowed, preferably controlled by means of the "don't fragment" flag.

Figure 9:
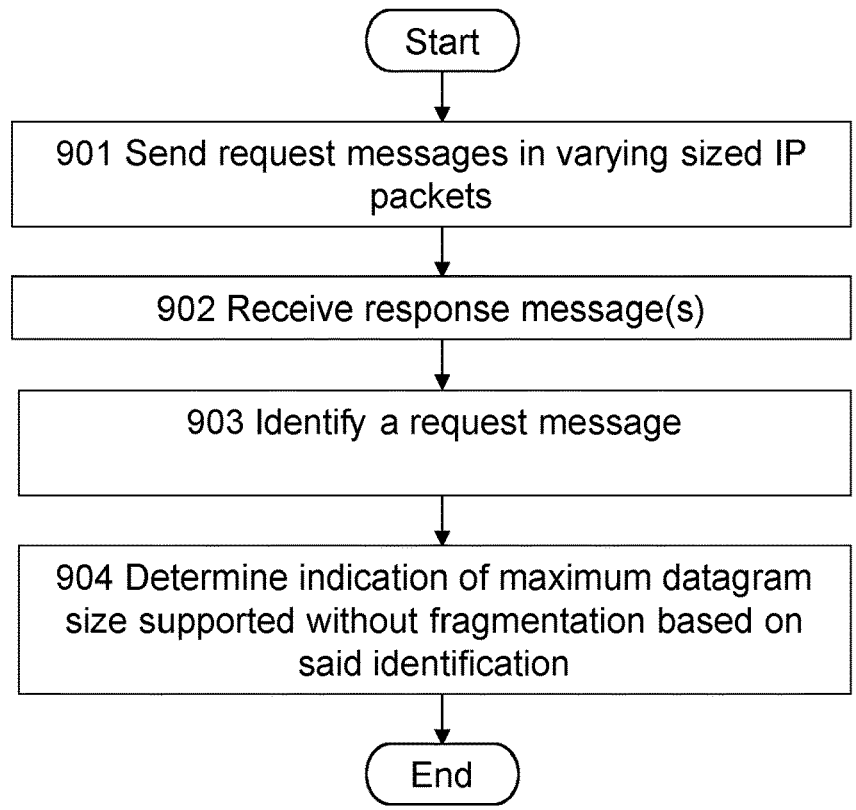
FIG. 9 is a flowchart schematically illustrating embodiments of a first method according to embodiments herein.

FIG. 9 is a flowchart schematically illustrating embodiments of a first method according to embodiments herein. The first method is performed by a first node, e.g. the first node 110, the first radio network node 210, the core network node 212, or the external network node 310, of an IP network. The first method is for determining an indication of a maximum datagram size supported without fragmentation in communication between the first node and a second node of said IP network. The second node may e.g. be the second node 111 when the first node is the first node 110, the second radio network node 211 when the first node is the first radio network node 219, the first radio network node 210 when the first network node is the core network node 212, or the communication device 220 when the first node is the external network node 310.

The IP network may be the IP network 100. In some embodiments, the IP network is part of a RAN, e.g. the RAN 201, of a wireless communication network, e.g. the wireless communication network 200, and/or part of a CN, e.g. the CN 202, of a wireless communication network, e.g. the wireless communication network 200. In these embodiments the first node may correspond to a first radio network node, e.g. the first radio network node 210, of the RAN and the second node may correspond to a second radio network node, e.g. the second radio network node 211 of the RAN. Another alternative in these embodiments is that the first node corresponds to a core network node, e.g. the core network node 212, of the CN and the second node corresponds to a radio network node, e.g. the first radio network node 210 of the RAN, or vice versa.

In the following, to simplify, the first node 110 will be used to exemplify the first node performing the first method, the second node 111 will be used to exemplify the second node and the IP network 100 will be used to exemplify the IP network.

The first method comprises the following actions, which actions may be taken in any suitable order and/or be carried out fully or partly overlapping in time when this is possible and suitable.

Action 901

The first node 110 send, to the second node 111, request messages in varying sized IP packets using an application layer protocol over UDP, and which IP packets are configured not to be fragmented by the IP network 100.

The application layer protocol over UDP may be SNMP. The first node may operate as a SNMP manager when sending the request messages and the second node 111 may operate as an SNMP agent when sending the response messages. The request messages may be SNMP GetRequest messages and the response messages may be SNMP GetResponse messages.

The varying sized IP packets may be accomplished by means varying sized padding in the IP packets.

In some embodiments, the varying sized IP packets are being varied in size by being consecutively larger or smaller in size.

This action may fully or partly correspond to action 301 and actions 801a-n as described above.

Action 902

The first node 110 receives, from the second node 111, in response to the sent request messages, one or more response messages, respectively. Each response message indicating that a datagram of a request message that the response message is in response to, was received by the second node 111.

The response messages are preferably sufficiently small to avoid fragmentation.

This action may fully or partly correspond to action 302 and actions 802a to 802n-1 as described above.

Action 903

The first node 110 identifies a certain request message of said varying sized IP packets for which there is a change in receipt of response message compared to another request message of said varying sized IP packets.

This action may fully or partly correspond to action 303 as described above.

Action 904

The first node 110 determines, based on said certain identification of Action 903, an indication of a maximum datagram size supported without fragmentation for application layer data communication over UDP between the first node 110 and the second node 111.

The indication may be a measure further determined based on the size of an IP packet of said varying sized that carried a request message resulting in a response message and which IP packet is closest in size to the IP packet of said identified request message.

This action may fully or partly correspond to action 304 as described above.

A second method according to embodiments herein is performed by a node, e.g. the first node 110 or the second node 111, of an IP network, e.g. the IP network 100. The second method may be described as a method for communicating application layer data over UDP using a maximum datagram size supported without fragmentation.

The node, e.g. the first node 110 or the second node 111, receives and/or sends application user application layer data over UDP from and/or to another node. If the node performing the method is the first node 110, the other node may be the second node 111, and vice versa. The data is being received and/or sent using a determined measure of a maximum datagram size supported without fragmentation for application layer data communication over UDP between the involved nodes. The measure being based on the determined indication in Action 904 or 304.

The second method may fully or partly correspond to action 305 as described above.

Figure 10:
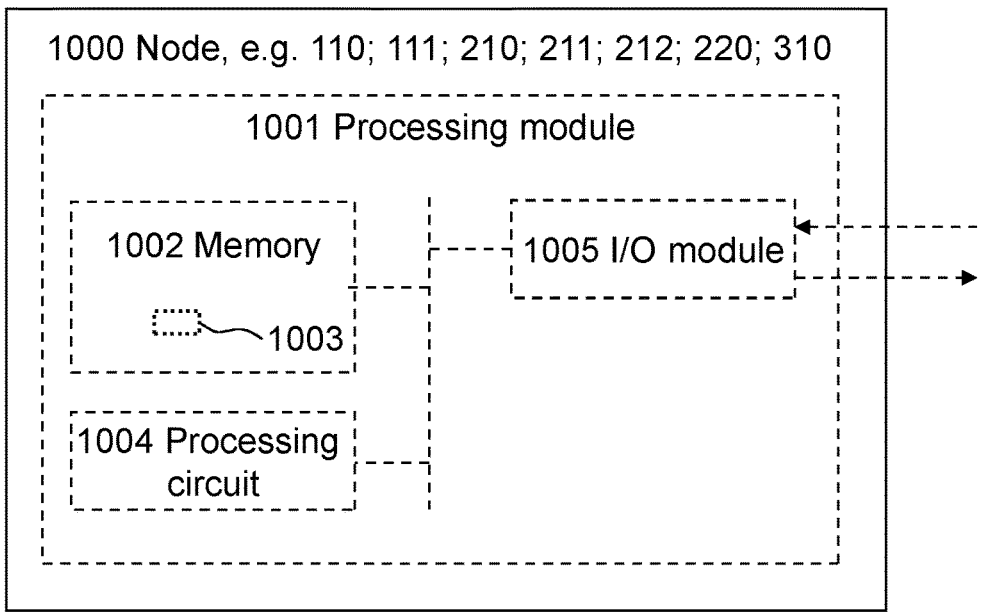
FIG. 10 is a functional block diagram for illustrating embodiments of a first node according to embodiments herein and how it can be configured to carry out the first method.

FIG. 10 is a schematic block diagram for illustrating embodiments of how a node 1000, e.g. the first node above exemplified by the first node 110, may be configured to perform the first method and actions discussed above in connection with FIG. 9. The schematic block diagram is also used for illustrating embodiments of how the node 1000, in this case corresponding to the node mentioned above in connection with the second method, may be configured to perform the second method and actions thereof.

Hence, the node 1000, is, at least in some embodiments, for determining an indication of a maximum datagram size supported without fragmentation in communication between the first node 1000 and the second node, exemplified by the second node 111 in the following, in the IP network exemplified by the IP network 100 in the following.

The node 1000 may comprise a processing module 1001, such as a means, one or more hardware modules, including e.g. one or more processors, and/or one or more software modules for performing said method(s) and/or actions.

The node 1000 may further comprise a memory 1002 that may comprise, such as contain or store, a computer program 1003. The computer program 1003 comprises 'instructions' or 'code' directly or indirectly executable by the node 1000 so that it performs said methods and/or actions. The memory 1002 may comprise one or more memory units and may further be arranged to store data, such as configurations and/or applications involved in or for performing functions and actions of embodiments herein.

Moreover, the node 1000 may comprise a processing circuit 1004 as an exemplifying hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the node 1000 is operative, or configured, to perform said method(s) and/or actions thereof.

Typically the node 1000, e.g. the processing module 1001, comprises an Input/Output (I/O) module 1005, configured to be involved in, e.g. by performing, any communication to and/or from other units and/or nodes, such as sending and/or receiving information to and/or from other nodes or devices. The I/O module 1005 may be exemplified by an obtaining, e.g. receiving, module and/or a providing, e.g. sending, module, when applicable.

Further, in some embodiments, the communication device 120, e.g. the processing module 801, comprises one or more of a sending module, a receiving module, an identifying module and a determining module, as exemplifying hardware and/or software module(s). These modules may be fully or partly implemented by the processing circuit 1004.

The node 1000, and/or the processing module 1001, and/or the processing circuit 1004, and/or the I/O module 1005, and/or the sending module may be operative, or configured, to send, to the second node 111, said request messages.

Further, the node 1000, and/or the processing module 1001, and/or the processing circuit 1004, and/or the I/O module 1005, and/or the receiving module may be operative, or configured, to receive, from the second node 111, in response to the sent request messages, said one or more response messages.

Moreover, the node 1000, and/or the processing module 1001, and/or the processing circuit 1004, and/or the I/O module 1005, and/or the identifying module may be operative, or configured, to identify said request message for which there is a change in receipt.

Also, the node 1000, and/or the processing module 1001, and/or the processing circuit 1004, and/or the I/O module 1005, and/or the determining module may be operative, or configured, to determine, based on said identification, said indication of the maximum datagram size supported without fragmentation for application layer data communication over UDP between the node 1000 and the second node 111.

Furthermore, in some embodiment, the node 1000, and/or the processing module 1001, and/or the processing circuit 1004, and/or the I/O module 1005, are operative, or configured, to receive and/or send said application user application layer data over UDP from and/or to said another node using the determined measure of the maximum datagram size supported without fragmentation.

Figure 11:
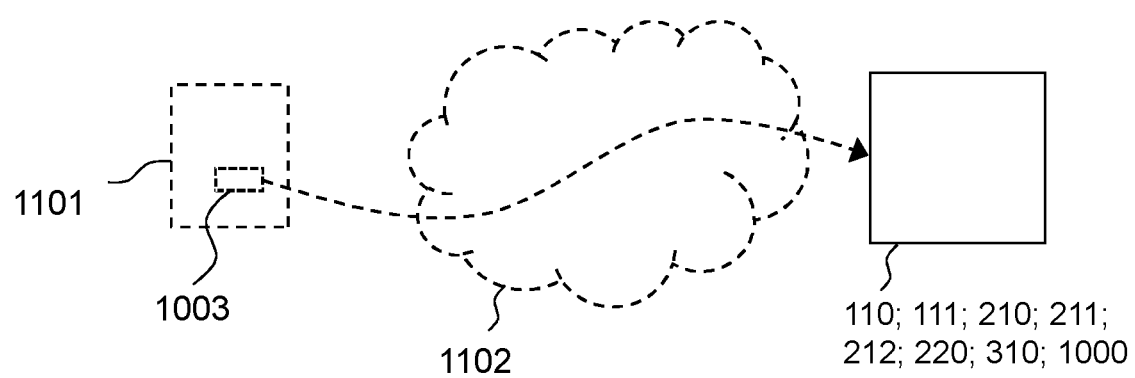
FIG. 11 is a schematic drawing illustrating embodiments relating to a computer program, and carriers thereof, to cause the first node to perform the first method.

FIG. 11 is a schematic drawing illustrating some embodiments relating to computer program and carriers thereof to cause said node 1000 discussed above to perform the method(s) and actions. The computer program may be the computer program 1003 and comprises instructions that when executed by the processing circuit 1004 and/or the processing module 1001, causes the node 1000 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 1101 as schematically illustrated in the figure. The computer program 1003 may thus be stored on the computer readable storage medium 1101. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1101 may be used for storing data accessible over a computer network 1102, e.g. the Internet or a Local Area Network (LAN). The computer program 1003 may furthermore be provided as pure computer program(s) or comprised in a file or files. The file or files may be stored on the computer readable storage medium 1101 and e.g. available through download e.g. over the computer network 1102 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuit 1004. The file or files may also or alternatively be for intermediate download and compilation involving the same or another processor to make them executable before further download and execution causing said node 1000 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first node of an Internet Protocol, IP, network, for determining an indication of a maximum datagram size supported without fragmentation in communication between the first node and a second node of said IP network, wherein the method comprises:
    sending, to the second node, request messages in varying sized IP packets using an application layer protocol over User Datagram Protocol, UDP, and which IP packets are configured not to be fragmented by the IP network,
    receiving, from the second node, in response to the sent request messages, one or more response messages, respectively, each response message indicating that a datagram of a request message that the response message is in response to, was received by the second node,
    identifying a request message of said varying sized IP packets for which there is a change in receipt of response message compared to another request message of said varying sized IP packets, and
    determining, based on said identification, an indication of a maximum datagram size supported without fragmentation for application layer data communication over UDP between the first node and the second node.

2. The method as claimed in claim 1, wherein the indication is a measure that is further determined based on the size of an IP packet of said varying sized that carried a request message resulting in a response message and which IP packet is closest in size to the IP packet of said identified request message.

3. The method as claimed in claim 1, wherein the varying sized IP packets are being varied in size by being consecutively larger or smaller in size.

4. The method as claimed in claim 1, wherein the application layer protocol over UDP is Simple Network Management Protocol, SNMP, the first node is operating as a SNMP manager when sending the request messages and the second node is operating as an SNMP agent when sending the response messages.

5. The method as claimed in claim 4, wherein the request messages are SNMP GetRequest messages and the response messages are SNMP GetResponse messages.

6. The method as claimed in claim 1, wherein the varying sized IP packets are accomplished by means of varying sized padding in the IP packets.

7. The method as claimed in claim 1, wherein the response messages are sufficiently small to avoid fragmentation.

8. The method as claimed in claim 1, wherein the IP network is part of a Radio Access Network, RAN, of a wireless communication network, and/or a Core Network, CN, of the wireless communication network, wherein the first node corresponds to a first radio network node of the RAN and the second node corresponds to a second radio network node of the RAN, or the first node corresponds to a core network node of the CN and the second node corresponds to a radio network node of the RAN, or vice versa.

9. A non-transitory computer readable medium comprising instructions that when executed by a processing circuit causes the first node to perform the method according to claim 1.

10. A first node for determining an indication of a maximum datagram size supported without fragmentation in communication between the first node and a second node in an Internet Protocol, IP, network, wherein the first node is configured to:
  send, to the second node, request messages in varying sized IP packets using an application layer protocol over User Datagram Protocol, UDP, and which IP packets are configured not to be fragmented by the IP network,
  receive, from the second node, in response to the sent request messages, one or more response messages, respectively, each response message indicating that a datagram of a request message that the response message is in response to, was received by the second node,
  identify a request message of said varying sized IP packets for which there is a change in receipt of response message compared to another request message of said varying sized IP packets, and
  determine, based on said identification, an indication of a maximum datagram size supported without fragmentation for application layer data communication over UDP between the first node and the second node.

11. The first node as claimed in claim 10, wherein the indication is a measure further determined based on the size of an IP packet of said varying sized that carried a request message resulting in a response message and which IP packet is closest in size to the IP packet of said identified request message.

12. The first node as claimed in claim 10, wherein the varying sized IP packets are being varied in size by being consecutively larger or smaller in size.

13. The first node as claimed in claim 10, wherein the application layer protocol over UDP is Simple Network Management Protocol, SNMP, the first node is configured to operate as a SNMP manager when sending the request messages and the second node is operating as an SNMP agent when sending the response messages.

14. The first node as claimed in claim 13, wherein the request messages are SNMP GetRequest messages and the response messages are SNMP GetResponse messages.

15. The first node as claimed in claim 10, wherein the varying sized IP packets are accomplished by means of varying sized padding in the IP packets.

16. The first node as claimed in claim 10, wherein the response messages are sufficiently small to avoid fragmentation.

17. The first node as claimed in claim 10, wherein the IP network is part of a Radio Access Network, RAN, of a wireless communication network, and/or a Core Network, CN, of the wireless communication network, wherein the first node corresponds to a first radio network node configured to be part of the RAN and the second node corresponds to a second radio network node of the RAN, or the first node corresponds to a core network node configured to be part of the CN and the second node corresponds to a radio network node of the RAN, or vice versa.

\* \* \* \* \*